UNITED STATES PATENT OFFICE.

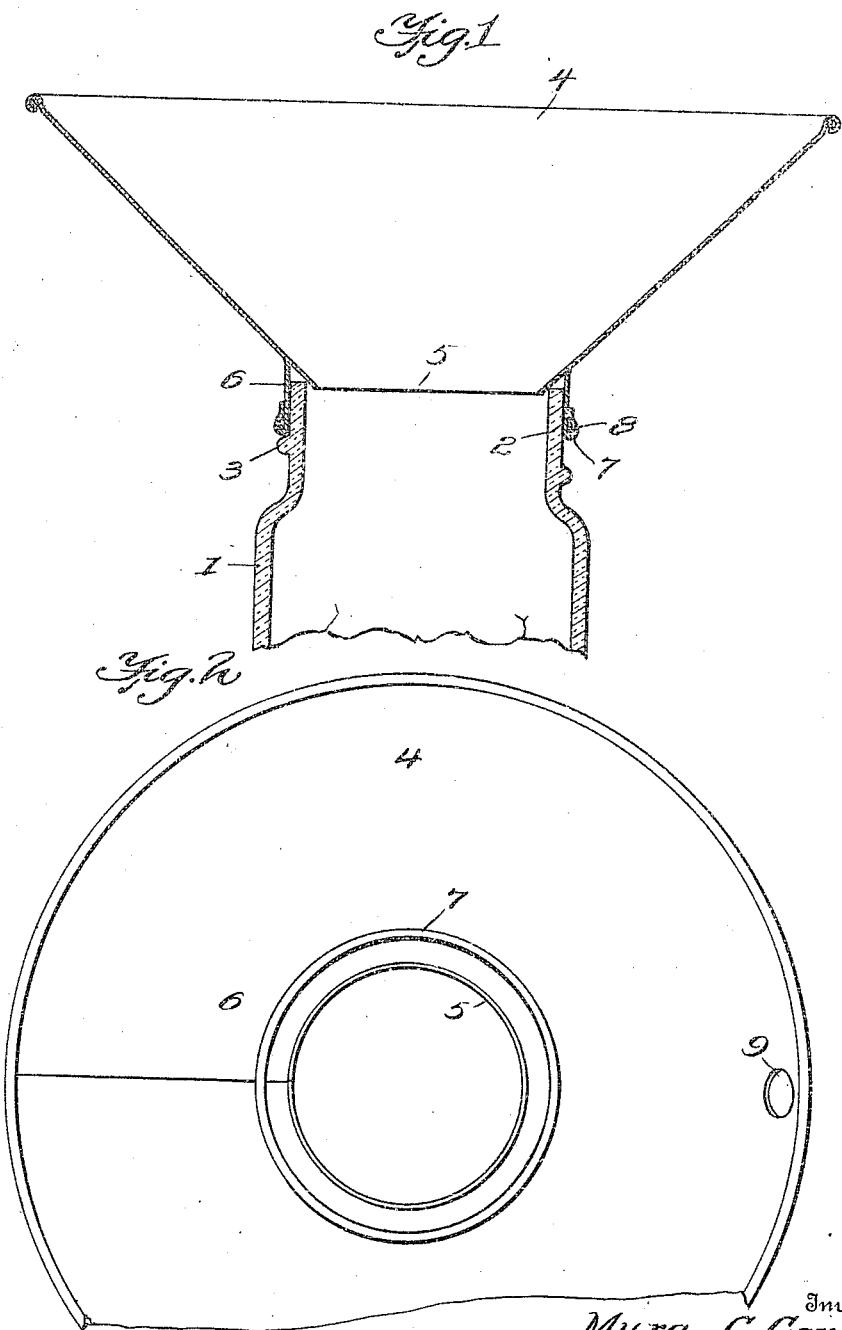

MYRA C. CARSON, OF VONORE, TENNESSEE.

JAR-FILLER.

959,715.  Specification of Letters Patent.  Patented May 31, 1910.

Application filed January 19, 1909.  Serial No. 473,139.

*To all whom it may concern:*

Be it known that I, MYRA C. CARSON, a citizen of the United States, residing at Vonore, in the county of Monroe and State of Tennessee, have invented new and useful Improvements in Jar-Fillers, of which the following is a specification.

This invention relates to jar fillers, contemplating the provision of a device for filling jars with fruit in preserving, etc., the object of the invention being to provide a filling funnel which will be self-supporting upon the mouth of the jar, will be free from the objection of projecting unduly into the jar and interfering with the entrance of the fruit, or the operation of filling the jar full up to the mouth, and will provide for the admission of the fruit in perfect condition as to size and shape, and which when removed will not be covered with juice and allow the same to drip and soil the outside of the jar.

The invention consists of the features of construction, combination and arrangement of parts hereinafter fully described and claimed, reference being had to the accompanying drawings, in which:—

Figure 1 is a vertical section showing the application of the filler to the mouth of a jar. Fig. 2 is a bottom plan view of the filler.

Referring to the drawing, 1 designates a jar or other similar receptacle having a mouth or neck portion 2 provided with an external screw thread 3 for the attachment of a cap or closure thereto. In the present instance I have shown the mode of use of my invention in connection with such a jar, but it is to be understood that it may be employed for filling other types of jars, cans or other receptacles.

The filler embodying my invention comprises an inverted frusto-conical vessel 4, the lower or reduced end of which is cut-away sufficiently to provide a comparatively wide discharge opening 5. In practice, the reduced end of the vessel conforms substantially in diameter with the internal diameter of the mouth of the jar or receptacle, so that it will but slightly enter the same, as shown in Fig. 1, the reduced end of the vessel simply resting upon the inner edge of the rim of the neck of the receptacle to assist in supporting said vessel in position. The reduced end of the vessel is provided on its outer side with depending means to embrace and engage the exterior of the mouth of the receptacle to brace and securely support the vessel and sustain it firmly against movement. The supporting means shown in the present instance comprises a more or less resilient band 6 secured at its upper edge to the vessel 4 a short distance above the discharge opening 5, and preferably provided at its lower edge with a bead or rim 7 inclosing a stiffening wire 8 to limit its resiliency. When the vessel is applied to the jar or receptacle in the manner described, the band 6 fits down about the mouth of the receptacle and frictionally engages the same, thus securely supporting the receptacle in position against movement in any direction. If the filler is employed in conjunction with jars of the type shown, the band may be made of such depth as to engage a portion of the thread 3, so that the latter will serve as a gage or stop, as will be readily understood.

In employing the device for filling fruits or preserves into a receptacle, it is applied to said receptacle in the manner shown in Fig. 1, and the fruit is filled into the vessel 4, from which it discharges into the receptacle through the outlet 5. As this outlet is of considerable size, it will be understood that the fruit may freely enter the receptacle without a partial force feed, and therefore, without further reduction of the fruit in size or alteration in shape of the portions thereof. Hence fruit of that kind customarily preserved in large sections or pieces may be filled into the jar without mashing or impairing the shape of the portions. After the jar is filled the device may be conveniently removed by an upward pull to slip the band 6 out of engagement with the neck. As the reduced end of the receptacle projects in use but slightly within the neck, unlike the contracted nozzle of an ordinary filler funnel, it will be understood that the outer surface thereof will not be coated with the juice of the fruit, and hence that there will be no drippings to fall upon and soil and require a subsequent cleaning of the outer surface of the jar. The advantage of the device over the ordinary filling funnel will accordingly be apparent.

Having thus fully described the invention, what is claimed as new, is:—

As a new and improved article of manufacture, a filler for use in connection with Mason and like screw-neck fruit jars, the same comprising an inverted frusto-conical vessel having a comparatively wide mouth at its lower reduced end substantially coextensive in diameter with the internal diameter of the mouth of the jar, whereby the mouth portion of the vessel is adapted to slightly enter the mouth of the jar and rest upon the inner edge of the rim of the jar, thus sealing the mouth of the jar and supporting the weight of the vessel, and an annular resilient band secured at its upper edge to the outer surface of the vessel above the lower edge of said vessel and projecting downward below the vessel, said band being coextensive in diameter with the outside diameter of the neck of the jar above the threads thereon, whereby said band is adapted by its resiliency to snugly hug or grip the jar and prevent tilting of the vessel thereon and hold the vessel in engagement with the rim edge of the jar to prevent escape of the fruit juices.

In testimony whereof I affix my signature in presence of two witnesses.

MYRA C. CARSON.

Witnesses:
 CORA MAGHEE,
 BURCH CARSON.